US012180319B1

(12) United States Patent
Kuterbekov et al.

(10) Patent No.: US 12,180,319 B1
(45) Date of Patent: Dec. 31, 2024

(54) SILICONE POLYETHERS

(71) Applicant: Dow Silicones Corporation, Midland, MI (US)

(72) Inventors: Mirasbek Kuterbekov, London (GB); Sophie Hanssens, Seneffe (BE); Stephane Ugazio, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/712,587

(22) PCT Filed: Oct. 12, 2022

(86) PCT No.: PCT/US2022/077933
§ 371 (c)(1),
(2) Date: May 22, 2024

(87) PCT Pub. No.: WO2023/122364
PCT Pub. Date: Jun. 29, 2023

Related U.S. Application Data

(60) Provisional application No. 63/291,553, filed on Dec. 20, 2021.

(51) Int. Cl.
*C08G 77/46* (2006.01)
*C08F 2/24* (2006.01)
*C08F 283/12* (2006.01)
*C08G 77/12* (2006.01)
*C08G 77/20* (2006.01)

(52) U.S. Cl.
CPC .............. *C08F 283/12* (2013.01); *C08F 2/24* (2013.01); *C08G 77/46* (2013.01); *C08G 77/12* (2013.01); *C08G 77/20* (2013.01)

(58) Field of Classification Search
CPC ........ C08G 77/12; C08G 77/44; C08G 77/46; C08F 283/12
See application file for complete search history.

(56) References Cited

U.S. PATENT DOCUMENTS

| | | | |
|---|---|---|---|
| 3,784,479 A | 1/1974 | Keil | |
| 3,984,347 A | 10/1976 | Keil | |
| 4,383,062 A | 5/1983 | Saad et al. | |
| 4,814,514 A | 3/1989 | Yokota et al. | |
| 4,983,316 A | 1/1991 | Starch | |
| 5,371,159 A | 12/1994 | Tsuzuki et al. | |
| 5,741,439 A | 4/1998 | Armstrong et al. | |
| 5,869,727 A | 2/1999 | Crane et al. | |
| 6,346,553 B1 | 2/2002 | LeGrow et al. | |
| 6,372,830 B1 | 4/2002 | Sato et al. | |
| 6,512,015 B1 | 1/2003 | Elms et al. | |
| 6,706,811 B2 | 3/2004 | Ohashi | |
| 6,987,157 B2 | 1/2006 | Clement et al. | |
| 7,294,653 B2 | 11/2007 | Zeng | |
| 7,429,636 B2 | 9/2008 | Asch et al. | |
| 7,619,035 B2 | 11/2009 | Henning et al. | |
| 7,767,747 B2 | 8/2010 | Lind et al. | |
| 8,008,407 B2 | 8/2011 | Oberhellman et al. | |
| 8,354,488 B2 | 1/2013 | Li | |
| 8,541,514 B2 | 9/2013 | Ferritto et al. | |
| 9,452,127 B2 | 9/2016 | Mitra et al. | |
| 9,610,239 B2 | 4/2017 | Feng et al. | |
| 9,777,121 B2 | 10/2017 | Sakurai | |
| 9,862,856 B2 | 1/2018 | Yang et al. | |
| 9,926,338 B2 | 3/2018 | Calimente et al. | |
| 10,085,928 B2 | 10/2018 | Sawayama et al. | |
| 10,385,212 B2 | 8/2019 | Kennedy et al. | |
| 10,844,176 B2 | 11/2020 | Igarashi | |
| 2010/0022435 A1 | 1/2010 | Henning et al. | |
| 2010/0184935 A1 | 7/2010 | Oberhellman et al. | |
| 2011/0311810 A1* | 12/2011 | Yamagata | C09J 183/12 524/401 |
| 2014/0147668 A1* | 5/2014 | Yamagata | C09J 7/385 524/265 |
| 2015/0323850 A1 | 11/2015 | Shitagami et al. | |

FOREIGN PATENT DOCUMENTS

| | | | |
|---|---|---|---|
| CN | 102020817 | 4/2011 | |
| CN | 112044353 | 12/2020 | |
| EP | 3498777 | 6/2019 | |
| GB | 1387713 | 3/1975 | |
| JP | 6065379 | 1/2017 | |
| WO | 2013103147 | 7/2013 | |
| WO | WO-2014020868 A1 * | 2/2014 | ............ C09J 133/06 |
| WO | 2017140816 | 8/2017 | |
| WO | 2020263379 | 12/2020 | |

OTHER PUBLICATIONS

Adeka Reasoap ER-SR series datasheet (Year: 2011).*
Davies, A Quantitative Kinetic Theory of Emulsion Type, I. Physical Chemistry of the Emulsifying Agent, 1957, vol. 1, pp. 426-438.
Hernandex-Moreno, Acute Hazard of Biocides for the Aquatic Environmental Compartment from a Life-Cycle Perspective, Science of The Total Environment, 2019, vol. 658, 2019, pp. 416-423.

* cited by examiner

Primary Examiner — Michael M Dollinger
(74) Attorney, Agent, or Firm — Edward W. Black

(57) ABSTRACT

A class of silicone polyethers represented by formula (I) along with methods for their preparation including the steps of combining: a) a polyorganohydrogensiloxane ("—SiH polymer") as represented by formula (VI) and b) a polyoxyalkylene as represented by formula (VII) in the presence of c) a hydrosilylation catalyst.

15 Claims, No Drawings

SILICONE POLYETHERS

CROSS REFERENCE TO RELATED APPLICATIONS

This application is a U.S. national stage filing under 35 U.S.C. 4371 of PCT Application no. PCT/US2022/077933 filed on 12 Oct. 2022, which claims the benefit of U.S. Provisional Patent Application Ser. No. 63/291,553 filed on 20 Dec. 2021 under 35 U.S.C. § 119 (e). PCT Application no. PCT/US2022/077933 and U.S. Provisional Patent Application Ser. No. 63/291,553 hereby incorporated by reference.

FIELD

This invention is directed toward a new class of silicone polyethers including methods for making and using the same.

INTRODUCTION

Silicone polyethers ("SPEs") represent a well know class of polyorganosiloxane-polyoxyalkylene copolymers. A wide variety of polymeric structures are known including block, branched, raked and gemini-type structures. SPEs are used in a wide variety of applications including as surfactants, foaming agents, solubilizers and softeners. They are also known for adding leveling, slip and mar resistance properties to coating formulations as well as for use as additives in personal care products. SPEs are classically made via a well-known platinum catalyzed hydrosilylation reaction between an —SiH group of a polyorganohydrogensiloxane and an unsaturated aliphatic hydrocarbon group (e.g. vinyl, allyl, etc.) of a polyoxyalkylene. Such reactions are most commonly conducted neat or in an organic solvent (e.g. alcohol, hydrocarbon, ether, etc.). See for example: U.S. Pat. Nos. 6,346,553, 6,987,157, 8,008,407, 8,541,514, U.S. Ser. No. 10/385,212 and EP349877.

SUMMARY

In one aspect, the invention includes a novel class of SPEs as represented by formula (I). In another aspect, the invention includes methods for preparing such SPEs including combining a) a polyorganohydrogensiloxane ("—SiH polymer") as represented by formula (VI) and b) a polyoxyalkylene as represented by formula (VII) in the presence of c) a hydrosilylation catalyst. In another aspect of the invention, the subject method includes combining the aforementioned components a), b) and c) in water. In yet another aspect of the invention, the subject method includes combining the aforementioned components a), b) and c) in water and forming an oil-in-water emulsion and conducting an in-situ hydrosilylation to form the subject SPE as a reaction product in the emulsion.

DETAILED DESCRIPTION

The subject invention includes a class of silicone polyethers (SPEs) represented by the formula

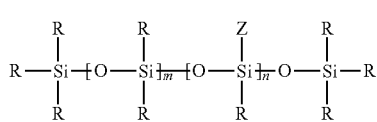

(I)

wherein:

R is the same or different and is selected from: H (hydrogen) and a hydrocarbon group comprising from 1 to 18 carbon atoms and more preferably from 1 to 8 carbon atoms with the proviso that R comprises less than 80, 50, or 25 mol % H. In selected embodiments, R comprises from 0 to 25 or 0 to 5 mol % H. Representative hydrocarbon groups include: a) alkyl groups such as: methyl, ethyl, propyl, butyl, pentyl, hexyl, cyclohexyl and heptyl; b) aryl groups such as phenyl, tolyl, xylyl and naphthyl; and c) aralkyl groups such as benzyl and phenethyl; however methyl and phenyl groups are preferred with methyl being most preferred. In one class of embodiments, R comprises at least 20, 50, 75, 90 or even 95 mol % of methyl groups (as determined by $^{29}$Si NMR).

m is an integer from 0 to 100, 0 to 70 or 0 to 40.

n is an integer from 10 to 500, 20 to 200, 40 to 100 or 50 to 70.

Z is the same or different and is selected from: Y, OH (hydroxyl) and an organosiloxane group represented by the following formula:

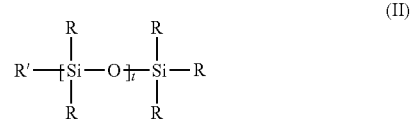

(II)

wherein R is as previously defined, R' is an aliphatic bivalent hydrocarbon (e.g. alkylene) group having from 2 to 4 carbon atoms, and t is 10 to 800.

Y is represented b following formula:

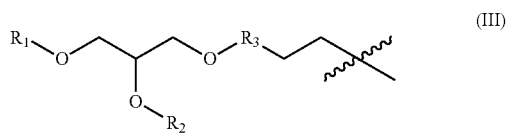

(III)

wherein:

the symbol 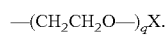 represents a covalent bond with the silicon atom of the repeating unit n in formula L $R_1$ is the same or different and is selected from an aliphatic hydrocarbon group (e.g. alkyl groups) comprising from 8 to 20 carbon atoms.

$R_2$ is represented by the following formula: (IV): -(AO)$_q$—X wherein:

A is the same or different and is selected from aliphatic bivalent hydrocarbon (e.g. alkylene) group having from 2 to 4 carbon atoms with the proviso that (AO)$_q$ comprises at least 3 (e.g. from 8 to 40 or 10 to 40) ethylene oxide moieties. For example, in one class of embodiments, $R_2$ is represented by the following formula:

—(CH$_2$CH$_2$O—)$_q$X.  (V):

wherein:

q is an integer from 3 to 40.

X (as set forth in both formulae IV or V) is the same or different and is selected from: H (hydrogen) and an aliphatic hydrocarbon (e.g. alkyl) group having from 1 to 4 carbon atoms.

$R_3$ is the same or different and is an aliphatic bivalent hydrocarbon (e.g. alkylene) group comprising from 1 to 4 carbon atoms. In one class of embodiments, $R_3$ is a methylene group.

Z is additionally subject to the proviso of comprising:
i) 10 to 80 mol % of Y,
ii) 0 to 60 mol % OH, and
iii) 0 to 60 mol % of the organosiloxane group of formula II.

In another embodiment, Z comprises greater than 40 mol % of Y, and the sum of OH and organosiloxane is less than 60 mol %.

In another class of embodiments, the subject SPE is represented by the following formula:

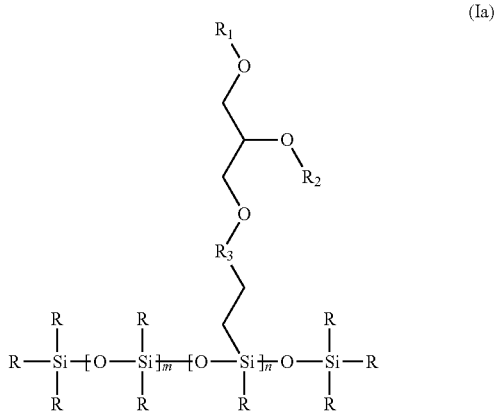

(Ia)

wherein R, m, n, $R_1$, $R_2$ and $R_3$ are as defined above but where R is preferably methyl, m is preferably from 0 to 40, n is preferably from 20 to 200, $R_1$ is the same or different and is preferably selected from alkyl groups comprising from 8 to 20 carbon atoms and $R_3$ is the same or different and is preferably selected from alkylene groups comprising from 1 to 4 carbon atoms.

The subject SPEs may be prepared by combining component a) a polyorganohydrogensiloxane (—SiH Polymer) and component b) a polyoxyalkylene in the presence of component c) a hydrosilylation catalyst. Each component (a, b and c) is described in more detail below. While the subject combination of components a), b) and c) is unique, the technique for combining these components may employ conventional methods. For example, components a), b) and c) may be combined neat or in an organic solvent. However, in a preferred embodiment, the aforementioned components are combined and reacted to form an in-situ silicone polyether reaction product in water. In yet a more preferred embodiment, the aforementioned components are combined to form a discontinuous oil phase within a continuous water phase, i.e. an oil-in-water emulsion, in which a hydrosilylation reaction is conducted between components a) and b) to form an in-situ silicone polyether reaction product as part of the discontinuous oil phase. Such processes are often referred to as mechanical suspension polymerization (MSP). While components a), b) and c) along with additional optional components as described below may be combined in any order, at least a portion (e.g. majority portion by weight) of components a) and b) are preferable combined in water with mixing to form a discontinuous (oil) phase prior to addition of the majority of component c). The initial water or the emulsion formed from the addition of the aforementioned components may be optionally heated to facilitate the hydrosilylation reaction. The water used to prepare the emulsion may be from any source and may optionally be purified, e.g. through filtration, distillation, reverse osmosis techniques, etc.

Unlike conventional methods of forming oil-in-water emulsions, the preparation of the subject emulsion does not require the use of surfactants (emulsifiers) other than component b). As component b) is reacted with component a), the resulting emulsion including the silicone polyether reaction product may be substantially free of surfactant. That is, by selecting the appropriate molar ratio of alkenyl groups of component b) to SiH groups of component a), all or substantially all the initial surfactant (component b) used to prepare the initial emulsion is reacted with component a) to form the subject silicone polyether reaction product and is no longer present as such in the final emulsion. This attribute is beneficial in many applications including the use of such emulsions in various hydrophobization applications among others where the presence of migratable surfactant is undesired. Thus while conventional non-reactive surfactants may be used to prepare the subject emulsion, in one class of embodiments, the subject emulsion is prepared without non-reacting surfactants (i.e. surfactants that do not react to form covalent bonds with component a). As such, the resulting emulsion of the subject silicone polyether reaction product is substantially free of surfactant. As used herein, the term "substantially free" means less than 1 wt %, preferably less 0. wt % and more preferably less than 0.1 wt % and still more preferably less than 0.01 wt %, based upon the total weight of the suspension. For clarity, in this context the silicone polyether reaction product itself is not considered as a "surfactant."

Mixing may be used to facilitate the formation of the emulsion. Mixing may occur using any known technique. Representative mixing devices include homogenizer, sonolator, rotor-stator turbines, colloid mill, microfluidizer, sonicator, blades, helix and combination thereof. Representative methodologies are described in U.S. Pat. Nos. 6,013,682, 8,877,293 and US2015/0010711. A homogenizer or sonic probe may be used to achieve desired particle size. The particles of the discontinuous oil phase preferably have a volume-weighted median value of particle diameter distribution "Dv(0.5)" of from 100 to 7000 nm and more preferably from 200 to 3000 nm as determined via laser diffraction using a Malvern 3000 and in accordance with ISO 13320 (2009). As used herein, the term "particles" refers to the oil phase droplets.

Component a): Polyorganohydrogensiloxane ("SiH polymer")

The class of polyorganohydrogensiloxanes applicable to the present invention is not particularly limited and includes a wide range of commercially available materials. Applicable polymers may have viscosities from 5 to 1000 cSt, more preferably from 10 to 500 cSt measured at 25° C. according to ASTM D2196-05. Different polyorganohydrogensiloxanes may be used in combination, e.g. those having different chemical structures, molecule weights and/or viscosities. A preferred class of SiH polymers may be represented by the following formula:

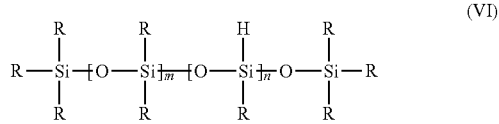

(VI)

where R, m and n are as previously defined.

As indicated, the subject SiH polymers include —SiH groups which may be located on the polysiloxane backbone at terminal (end) and intermediate (pendant) positions. However, in preferred embodiments, the —SiH groups are predominantly located at pendant positions, i.e. greater than 95 wt % and more preferably greater than 99 wt % of all —SiH groups are located at pendant positions along the polysiloxane chain as determined by $^{29}$Si NMR. Applicable commercially available SiH polymers include: SYL-OFF™ 7672 Crosslinker, SYL-OFF™ 7678 Crosslinker, SYL-OFF™ SL 7028 Crosslinker, SYL-OFF® 7682-000 Crosslinker and XIAMETER™ MHX-1107 Fluid 30 cSt, all available from the Dow Ciemical Co.

Component b): Polyoxyalkylene

The class of polyoxyalkylenes applicable for the present invention may be represented by the following formula:

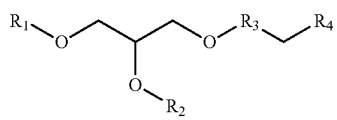

(VII)

wherein $R_1$, $R_2$ and $R_3$ are as previously defined and $R_4$ is the same or different and is selected from alkenyl and alkynyl.

The subject polyoxyalkylenes preferably have a hydrophile-lipophile balance (HLB) of from 3 to 35, or more preferably from 6 to 15 as calculated according to the Davies method (J. T. Davies, Gas/Liquid and Liquid/Liquid Interfaces. Proc. 2nd Int. Congress Surface Activity, vol. 1, A quantitative kinetic theory of emulsion type, I. Physical chemistry of the emulsifying agent. Butterworths, London (1957)) using the following equation: HLB=7+Σ(hydrophilic groups)+Σ(hydrophobic groups). Commercial examples of applicable polyoxyalkylenes include: ADEKA™ REASOAP ER10, ADEKA™ REASOAP ER20 and ADEKA™ REASOAP ER30 available from Adeka.

Component c): Hydrosilylation Catalyst

The hydrosilylation catalysts applicable to the present invention are not particularly limited and include platinum, rhodium, iridium, palladium, ruthenium or combinations thereof. The hydrosilylation catalyst may be for example, a fine platinum powder, platinum black, platinum acetylacetonate, chloroplatinic acid, an alcoholic solution of chloroplatinic acid, an olefin complex of chloroplatinic acid, a complex of chloroplatinic acid and alkenylsiloxane (e.g. divinyltetramethyl disiloxane diluted in dimethylvinylsiloxy end-blocked polydimethylsiloxane which may be prepared according to methods described in U.S. Pat. No. 3,419,593, a complex of platinous chloride and divinyl tetramethyl disiloxane as described in U.S. Pat. No. 5,175,325 or a thermoplastic resin that includes the aforementioned platinum catalyst. In other embodiments the hydrosilylation catalyst is a platinum vinyl siloxane complex such as Karstedt's catalyst or Speier's catalyst or combinations thereof. Additional examples of applicable catalyst are described in the following: U.S. Pat. No. 2,823,218, US315960, U.S. Pat. Nos. 3,220,972, 3,296,291, 3,419,359, 3,445,420, 3,516,946, 3,697,473, 3,715,334, 3,814,730, 3,814,731, 3,890,359 U.S. Pat. Nos. 3,923,705, 3,989,668, 4,123,604, 4,784,879 and 5,036,117. The hydrosilylation catalyst may be a single catalyst or a combination of two or more catalysts. A commercial example of applicable hydrosilylation catalyst includes: SYL-OFFrm 4000 Catalyst.

The molar ratio of component b) to the SiH groups of component a) is preferably less than 1:1, e.g. from 1:1 to 1:2. Using this molar ratio ensures that component b) is fully reacted and that the resulting silicone polyether reaction product (and corresponding emulsion containing the same) is substantially free of residual surfactant. The concentration of component c) (i.e. hydrosilylation catalyst) to be used in the present invention may be determined by routine experimentation. Typically, an effective amount of catalyst is in a range to provide from 0.1 to 3000 parts per million (ppm) of the actual metal (e.g. platinum) by weight based on the weight of components a) and b).

Optional Component d): Alkenyl Functional Polyorganosiloxane

The method for preparing the subject SPEs may include the step of combining an alkenyl functional polyorganosiloxane as an additional optional component ("component d"). The class of applicable polymers is not particularly limited so long as they include at least one and more preferably at least two alkenyl functional groups (e.g. vinyl, allyl, etc.). While the alkenyl groups may be present at either or both terminal and pendant locations along the siloxane backbone of the polyorganosiloxane, they are preferably located solely at a terminal end. For example, in a preferred embodiment, the subject alkenyl functional polyorganosiloxane is a vinyl end-blocked polydiorganosiloxane having the general formula: Vi-[Si(R'$_2$)O]$_v$—Si(R'$_2$)Vi, wherein R' is the same or different and selected from the same hydrocarbon groups as defined above as R, Vi is a vinyl group and v is an integer resulting in the polymer having a viscosity in the range of 5 to 100,000 measured at 25° C. according to ASTM D2196-05. R' is preferably methyl. When present, optional component d) is preferably used in a quantity such that the molar ratio of its alkenyl functional groups to the —SiH groups of component a) is from 2:1 to 0.1:1. Representative polymers are described in U.S. Ser. No. 10/385,212. Commercial examples of applicable polymers include: SILASTIC™ SFD 128, SILASTIC™ SFD-120, and DOWSIL™ SFD-119, all of which are available from The Dow Chemical Company.

Optional Component e): Oil

The method for preparing the subject SPEs may include the step of combining one or more oils as an additional optional component ("component e"). The class of applicable oils is not particularly limited and includes: i) hydrocarbon-based oils of a mineral, vegetable or synthetic origin, e.g. paraffin oil, hydrogenated isoparaffin, hydrogenated liquid polydecene, petrolatum, olive oil, linseed oil, etc. and ii) non-reactive polyorganosiloxanes, i.e. "silicones." Oils that are liquid at room temperature are preferred. Representative silicones include non-volatile species along with both linear and branched species. Representative classes include: polyalkylsiloxanes, polyaryl siloxanes, polyalkylarylsiloxanes, polysiloxane gums, polysiloxane elastomers and combinations thereof. A preferred group include DOWSIL™ 200 fluids (trimethyl silyl terminated polydimethylsiloxane) including those having viscosities from about 5 to about 200,000 cSt (centistokes) measured at 25° C. according to ASTM D4283-98 (2015). Combinations of different polyorganosiloxanes may be used together. When present, optional component e) preferably comprises from 10 to 80 wt % or from 20 to 70 wt % of the discontinuous oil phase of the emulsion.

When used, optional components d) and/or e) are preferably combined with components a) and b) when forming an initial emulsion of components a) and b). While the alkenyl functional polyorganosiloxane may participate in the hydrosilylation reaction of components a), e.g. resulting in the formation of organosiloxane group represented by formula (II) on the silicone polyether reaction product, component e) is preferably non-reactive and does not directly participate (e.g. break or form covalent bonds) in the hydrosilylation reaction. As such, component e) remains present in the discontinuous oil phase of the final emulsion including the silicone polyether reaction product.

In another embodiment, alcohol may be added to the resulting emulsion of the silicone polyether reaction product. The subject emulsions are surprisingly stable even after the addition of sufficient alcohol to form an emulsion having antimicrobial properties. For example, the subject emulsions remain stable with the addition of sufficient alcohol to comprise at least 10 wt %, 25 wt %, 50 wt %, 60 wt %, 70 wt %, 80 wt % or even 90 wt % of the total weight of the emulsion. In other embodiments, the alcohol comprises from 5 to 95 wt %, 10 to 90 wt %, or 25 to 75 wt % of the total weight of the emulsion. The selection of alcohol will typically depend upon the intended application; however, $C_1$-$C_6$ monohydric alcohols such as: methanol, ethanol, n-propanol, isopropanol, butanol, t-butanol, 2-butanol, pentanol, hexanol and combinations thereof are generally preferred. In a sub-class of embodiments, $C_2$-$C_4$ monohydric alcohols are preferred such as: ethanol, 1-propanol and 2-propanol and combinations thereof. The remaining proportion of the continuous phase of the subject emulsion may comprise water.

Many embodiments of the invention have been described and, in some instances, certain embodiments, selections, ranges, components, or other features have been characterized as being "preferred." Such designations of "preferred" features should in no way be interpreted as an essential or critical aspect of the invention. Expressed ranges specifically include designated end points. As used herein, the terms "molecular weight" and "Mw" refer to the weight average molecular weight as measured by gel permeation chromatography (GPC) using an Agilent Technologies 1260 Infinity chromatograph and toluene as a solvent. The instrument is equipped with three columns, a PLgel 5 μm 7.5×50 mm guard column and two PLgel 5 μm Mixed-C 7.5×300 mm columns. Calibrations are made using polystyrene standards. Samples are made by dissolving polymer in toluene (~1 mg/mL) and then immediately analyzing the material by GPC (1 mL/min flow, 35° C. column temperature, 25-minute run time). Particle size measurements were determined as the volume-weighted median value of particle diameter distribution (Dv50) of using a Mastersizer™ 3000 laser diffraction particle size analyzer from Malvern Instruments in accordance with ISO 13320 (2009).

EXAMPLES

Unless otherwise indicated, all preparation and testing was conducted at room temperature (RT) at standard pressure (1 atm or 760 mm Hg). Unless otherwise indicated percentages are weight percentages (wt %). The materials listed below in Table 1 were used in the preparation of sample emulsions. Polyorganosiloxane structures are designated in Table 1 using the conventional structural nomenclature: M-monofunctional ($R_3SiO_{1/2}$);

D-difunctional ($R_2SiO_{2/2}$);
T-trifunctional ($RSiO_{3/2}$);
Q-tetrafunctional ($SiO_{4/2}$).

For the polymers listed in Table 1, R is methyl and as per convention, is not indicated; however, hydrogen substituents are designated in superscript. For more information on the usage of this nomenclature, see Chemistry and Technology of Silicones, Noll, Academic Press, 1968.

TABLE 1

| Component | Name | Description |
|---|---|---|
| SiH Polymer | SiH Polymer 1 (inventive) | MD33.5$D^H$55.0M |
| SiH Polymer | SiH Polymer 2 (comparative) | MD92.3$D^H$6.2M |
| SiH Polymer | SiH Polymer 3 (comparative) | $M^H$D14.45$M^H$ |
| SiH Polymer | SiH Polymer 4 (inventive) | M0.44Q0.56 + MD$^H$65M |
| SiH Polymer | SiH Polymer 5 (comparative) | $M^H$D184$M^H$ |
| SiH Polymer | SiH Polymer 6 (comparative) | $M^H$D60.84$M^H$ |
| SiH Polymer | SiH Polymer 7 (comparative) | $M^H$D34.66$M^H$ |
| Polyoxyalkylene | ADEKA ™ REASOAP ER-10 | See chemical structure below (s = 10) |
| Polyoxyalkylene | ADEKA ™ REASOAP ER-20 | See chemical structure below (s = 20) |
| Polyoxyalkylene | ADEKA ™ REASOAP ER-30 | See chemical structure below (s = 30) |
| Polyoxyalkylene | Allyl Polyether 1 | See chemical structure below |
| Hydrosilylation Catalyst | SYL-OFF ™ 4000 Catalyst | Platinum catalyst |
| Alkenyl functional polyorganosiloxane | SILASTIC ™ SFD 128 Polymer | 0.088 wt % vinyl linear polydimethyl siloxane |
| Silicone oil | DOWSIL ™ 200 Fluid | MDnM *n dependent upon viscosity |

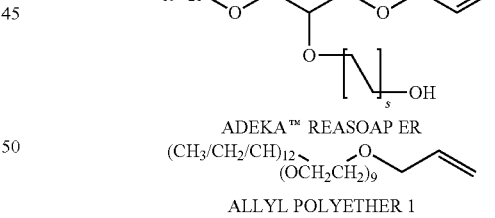

ADEKA™ REASOAP ER

ALLYL POLYETHER 1

Unless otherwise specified, sample emulsions were prepared using the components specified in the table above. Emulsions were prepared via a classic phase inversion process involving the sequential addition of water to an oil in the presence of a polyoxyalkylene which ultimately undergoes phase inversion forming a water-in-oil emulsion. Following this method, the designated oil, SiH polymer, and alkenyl functional polyorganosiloxane (if used), were first mixed followed by the addition of the designated polyoxyalkylene, inversion water and the hydrosilylation catalyst (if used), followed by the sequential addition of the remaining water. Unless otherwise specified, all components were mixed at 3500 rpm for 30 seconds using a dental mixer (Hauschild SpeedMixer). Reaction between polyoxyalkylene and SiH polymer was allowed to occur for approximately one week at room temperature (RT) followed by measurements of particle size distribution (Malvern Metasizer 3000). Emulsions prepared without catalysts served as comparisons.

The stability of the sample emulsions was measured after allowing the emulsions to set for approximately 1 week. Stability was tested for the sample emulsions as prepared and/or after the addition of isopropanol (i.e. 1 g of emulsion mixed with 5 g of isopropanol). The stability of the emulsion was assessed visually according to the following standard: (1) fully coalesced, (2) partially coalesced/creamed, (3) no sign of coalescence.

Example 1

Sample emulsions were prepared using the components specified below in Table 2. To evaluate hydrophobicity performance, sample emulsions were applied to paper, i.e. (LENETA FORM N2A-2) and pine blocks. The sample emulsions applied to paper were prepared using DOWSIL™ 200 Fluid 100,000 cSt, whereas those applied to pine were prepared using DOWSIL™ 200 Fluid 12,500 cSt. For paper, sample emulsions were applied as 120-μm-thick coatings which were dried overnight at room temperature and analyzed using the sessile drop method (Biolin Scientific Theta Optical). Water contact angles were estimated based on images captured 19 seconds after the deposition of 2.5 μl droplets and averaged over three measurements. For pine, sample emulsions were first diluted to 10 wt % silicone (i.e. the sum of components a and e) and applied at an average density of 5.6 mg/cm$^2$ and then dried at room temperature for approximately one week. The resulting wetting performance of each sample was then assessed 10 minutes after the deposition of 0.1 ml droplets of water using the following numerical scale from 1 to 5 using an average of three measurements.

| Rating | Wetting Performance |
|---|---|
| 1 | Complete wetting of substrate |
| 2 | Strong wetting and drop spreading |
| 3 | Medium wetting |
| 4 | Low wetting |
| 5 | No wetting, visually high contact angle |

As illustrated by the test results reported in Table 2, inventive sample no. 4 showed statistically significant improvement in hydrophobicity for both paper and pine along with improved stability in isopropanol (IPA) as compared with comparative sample nos. 1-3 and 5-6. Interestingly, the addition of a catalyst had little impact on the performance of the comparative samples, i.e. 1 vs. 2 and 5 vs. 6.

TABLE 2

| | Sample No. | | | | | |
|---|---|---|---|---|---|---|
| | 1 | 2 | 3 | 4 | 5 | 6 |
| Wt % Silicon Oil (DOWSIL™ 200 Fluid) | 53.4 | 53.4 | 59.4 | 59.4 | 56.8 | 56.8 |
| Wt % SiH Polymer 1 (inventive) | | | 0.6 | 0.6 | | |
| Wt % SiH Polymer 2 (comparative) | 6.6 | 6.6 | | | | |
| Wt % SiH Polymer 3 (comparative) | | | | | 3.2 | 3.2 |
| Wt % Polyoxyalkylene (ADEKA™ REASOAP ER-10) | 4.0 | 4.0 | 4.0 | 4.0 | 4.0 | 4.0 |
| Wt % Catalyst (SYL-OFF™ 4000) | | 0.1 | | 0.1 | | 0.1 |
| Wt % Inversion water | 4.0 | 4.0 | 4.0 | 4.0 | 4.0 | 4.0 |
| Wt % Dilution water | 32.0 | 31.9 | 32.0 | 31.9 | 32.0 | 31.9 |
| SiH/allyl ratio | 1/1 | 1/1 | 1/1 | 1/1 | 1/1 | 1/1 |
| Test Results: | | | | | | |
| Water contact angle on Lenta Chart | 52.2° | 57.6° | 62.8° | 84.4° | 60.3° | 61.2° |
| Wetting Performance on Pine Block | 1 | 1 | 1 | 3 | 1 | 2 |
| Emulsion Stability in isopropanol | 1 | 2 | 1 | 3 | 1 | 1 |

Example 2

Sample emulsions nos. 7-9 were prepared using the components specified below in Table 3. Each sample was tested for stability as per the methodology previously described. Each sample utilized a different species of polyoxyalkylene, all of which being selected from the claimed genus. As indicated below, each emulsion had good stability.

TABLE 3

| Sample No. | 7 | 8 | 9 |
|---|---|---|---|
| Polyoxyalkylene: | ADEKA™ REASOAP ER-10 | ADEKA™ REASOAP ER-20 | ADEKA™ REASOAP ER-30 |
| Wt % Silicone oil (DOWSIL™ 200 Fluid 12500 cSt) | 60.0 | 60.0 | 60.0 |
| Wt % SiH Polymer 1 | 0.7 | 0.5 | 0.3 |
| Wt % Polyoxyalkylene (ADEKA™ REASOAP) | 5.0 | 5.00 | 5.0 |

TABLE 3-continued

| Sample No. | 7 | 8 | 9 |
|---|---|---|---|
| Wt % Catalyst (SYL-OFF ™ 4000) | 0.4 | 0.4 | 0.4 |
| Wt % Inversion water | 4.3 | 4.3 | 4.3 |
| Wt % Dilution water | 29.6 | 29.9 | 30.0 |
| Emulsion Stability | 3 | 3 | 3 |
| Emulsion Stability in IPA | 3 | 3 | 3 |
| Particle Size: $D_v50$ | 6.6 | 3.1 | 4.1 |

Example 3: (Comparative)

To demonstrate the technical effect of the polyoxyalkylene structure, a comparison sample emulsion (no. 10) was prepared using a polyoxyalkylene species (Allyl Polyether 1) falling outside the claimed genus. That is, while Allyl Polyether 1 has a similar number of repeating alkoxy (EO) units and alkyl groups as those of claimed genus, Allyl Polyether 1 has a different structure. See the respective structures provided above. During preparation, comparative sample no. 10 demulsified and underwent phase segregation over the course of the reaction. While not wishing to be bound by theory, it is believed that the position of the allyl group of Allyl Polyether 1 partitions into the silicone discontinuous phase upon reaction, rather than remaining at the water-oil interface. Consequently, the emulsion is destabilized.

TABLE 4

| Sample No. | 10 |
|---|---|
| Wt % Silicone oil (DOWSIL ™ 200 Fluid 12500 cSt) | 59.7 |
| Wt % SiH Polymer 1 | 0.3 |
| Wt % Polyoxyalkylene (Allyl Polyether 1) | 4.0 |
| Wt % Catalyst (SYL-OFF ™ 4000) | 0.1 |
| Wt % Inversion water | 4.0 |
| Wt % Dilution water | 31.9 |
| SiH/allyl ratio | 1/2 |
| Emulsion Stability | 2 |

Example 4

Sample nos. 11 thru 15 illustrate the stability of the subject emulsions in isopropanol (IPA) when prepared with a wide variety of oils. These samples were prepared using the components listed below in Table 5 in accordance with the methodology previously described with the following exceptions: samples 13 and 14 where first mixed in a dental mixer as per the methodology previously described and then mixed at 11000 rpm using a rotor-stator disperser (ULTRA-TURRAX homogenizer), and then finally mixed at 3500 rpm for 30 seconds using a dental mixer.

TABLE 5

| Sample No. | 11 | 12 | 13 | 14 |
|---|---|---|---|---|
| Oil type | DOWSIL ™ 200 Fluid 12500 cSt | almond oil | mineral oil | linseed oil |
| Wt % Oil | 60.0 | 60.0 | 60.0 | 60.0 |
| Wt % SiH Polymer 1 | 0.5 | 0.5 | 0.5 | 0.5 |
| Wt % Polyoxyalkylene (ADEKA REASOAP ER-10) | 5.0 | 5.0 | 5.0 | 5.0 |
| Wt % Catalyst (SYL-OFF ™ 4000) | 0.4 | 0.4 | 0.4 | 0.4 |

TABLE 5-continued

| Sample No. | 11 | 12 | 13 | 14 |
|---|---|---|---|---|
| Wt % Inversion water | 4.3 | 4.3 | 4.3 | 4.3 |
| Wt % Dilution water | 19.9 | 19.9 | 19.9 | 19.9 |
| Emulsion Stability in IPA | 3 | 3 | 3 | 3 |

Example 5

This example illustrates ability to include additional reactive polymers, (e.g. SiH Polymer 2 and SILASTIC™ SFD 128 Polymer) in the subject emulsions, e.g. to increase molecular weight and crosslinking while still maintaining good emulsion stability. In this example, hydrosilylation is believed to take place both within the emulsion droplets to form a branched polymer (e.g. between SiH Polymer 2 and SILASTIC™ SFD 128 Polymer) but also at the interface between the polyoxyalkylene and SiH polymer 1. That is, the addition of other reactive polymers (such as SiH Polymer 2 and SILASTIC™ SFD 128 Polymer) does not interfere with the improved alcohol stability of the emulsions including the subject silicone polyether reaction product.

TABLE 6

| Sample No. | 15 |
|---|---|
| Wt % Silicone oil (DOWSIL ™ 200 Fluid 5cSt) | 24.0 |
| Wt % Alkenyl functional polyorganosiloxane (SILASTIC ™ SFD 128 Polymer) | 35.2 |
| Wt % SiH Polymer 2 | 0.6 |
| Wt % SiH Polymer 1 | 0.3 |
| Wt % Catalyst (SYL-OFF ™ 4000) | 0.2 |
| Wt % Polyoxyalkylene (ADEKA ™ REASOAP ER-10) | 4.0 |
| % Inversion water | 4.0 |
| % Dilution water | 31.8 |
| Mole ratio (SiH/C=C) | 1 |
| Emulsion Stability | 3 |
| Emulsion Stability in IPA | 3 |
| $D_v50$ | 0.64 |
| dried emulsion | Film |

Example 6

Sample emulsions were prepared using the components listed in Table 7 and then tested for stability in isopropanol. As illustrated by the test results reported below, the location of the SiH group in the SiH polymer had a significant impact on stability, i.e. SiH polymers 3 and 5-7 had SiH groups located solely at terminal positions whereas SiH polymers 1 and 4 had SiH groups located at pendant positions along the polyorganosiloxane backbone. $^1$H NMR analysis of the sample emulsions confirmed that the SiH groups of SiH Polymers no. 3 and 5-7 remained largely unreacted in sample Nos. 18 and 20-22 in contrast with the SiH Polymers no. 1 and 4 in sample emulsions nos. 16 and 19 where the NMR spectra showed evidence of hydrosilylation through formation of Si—CH$_2$— (0.7-0.4 ppm) and decrease of Si—H intensity (4.7 ppm). Thus, the location of the SiH bond has a significant effect on the reaction with the subject polyoxyalkylene and this in turn impacts emulsion stability. While SiH polymer 2 had SiH groups at pendent locations, it possessed an insufficient number of SiH groups to be effective at stabilizing the resulting emulsion.

TABLE 7

| | Sample No. | | | | | | |
|---|---|---|---|---|---|---|---|
| | 16 | 17 | 18 | 19 | 20 | 21 | 22 |
| SiH Polymer no. | 1 | 2 | 3 | 4 | 5 | 6 | 7 |
| | inv. | comp. | comp. | inv. | comp. | comp. | comp. |
| Wt % Silicon Oil (DOWSIL ™ 200 Fluid 12500 cst) | 59.4 | 59.0 | 62.8 | 56.7 | 24.6 | 52.3 | 58.2 |
| Wt % SiH polymer | 0.6 | 7.7 | 3.9 | 3.3 | 42.1 | 14.3 | 8.4 |
| Wt % polyoxyalkylene (ADEKA ™ REASOAP ER-10) | 4.0 | 4.4 | 4.4 | 4.0 | 4.4 | 4.4 | 4.4 |
| Wt % Catalyst (SYL-OFF ™ 4000) | 0.3 | 0.3 | 0.3 | 0.3 | 0.3 | 0.3 | 0.3 |
| Wt % Inversion water | 4.3 | 4.8 | 4.8 | 4.3 | 4.8 | 4.8 | 4.8 |
| Wt % Dilution water | 31.4 | 23.8 | 23.8 | 31.4 | 23.8 | 23.8 | 23.8 |
| Emulsion Stability in IPA | 3 | 1 | 1 | 3 | 1 | 1 | 1 |
| $D_v50$ | 9.48 | 0.71 | 0.80 | 3.58 | 0.68 | 0.66 | 0.74 |

Example 7

A silicone polyether reaction product was prepared neat by blending 0.6 g of SiH Polymer 1 and 4 g polyoxyalkylene (ADEKA™ REASOAP ER-10) with 0.1 g of SYL-OFF 4000 Catalyst and allowed to react for approximately one week at room temperature. After one week the blend that was initially a liquid formed a powdery solid. 4.60 g of the solid was then combined with the 60.00 g of silicone oil (DOWSIL™ 200 Fluid 12500 cSt) and 35.4 g of inversion water followed by mixing at 3500 rpm for 30 seconds using a dental mixer (Hauschild SpeedMixer). After which, a coarse emulsion (sample no. 24) was formed where big droplets were surrounded by jelly-like particles. Unlike when formed in-situ as part of a water-in-oil emulsion, when prepared neat, the subject silicone polyether reaction product was unable to form an equivalent stable emulsion. That is, the pre-formed silicone polyether reaction product did not function as an effective surfactant.

The invention claimed is:

1. A silicone polyether represented by the following formula:

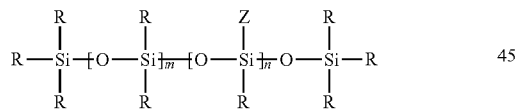

wherein:
R is the same or different and is selected from: H and a hydrocarbon group comprising from 1 to 18 carbon atoms with the proviso that R comprises less than 80 mol % H,
m is an integer from 0 to 100,
n is an integer from 10 to 500, and
Z is the same or different and is selected from: Y, OH and an organosiloxane group represented by the following formula:
(II):

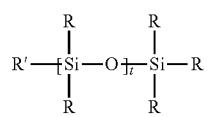

wherein R is as previously defined, R' is an aliphatic bivalent hydrocarbon group having from 2 to 4 carbon atoms, and t is 10 to 800;
Y is represented by following formula:

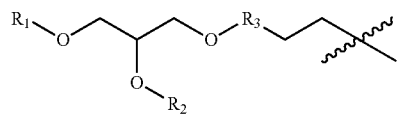

wherein:
$R_1$ is the same or different and is selected from an aliphatic hydrocarbon group comprising from 8 to 20 carbon atoms;
$R_2$ is represented by the following formula: $-(AO)_q-X$
wherein:
A is the same or different and is selected from aliphatic bivalent hydrocarbon group having from 2 to 4 carbon atoms with the proviso that $(AO)_q$ comprises at least 3 ethylene oxide moieties
q is an integer from 3 to 40, and
X is the same or different and is selected from: H and an aliphatic hydrocarbon group having from 1 to 4 carbon atoms; and
$R_3$ is the same or different and is an aliphatic bivalent hydrocarbon group comprising from 1 to 4 carbon atoms,
with the proviso that Z comprises:
i) 10 to 80 mol % of Y,
ii) 0 to 60 mol % OH, and
i) 0 to 60 mol % of the organosiloxane group of formula II.

2. The silicone polyether of claim 1 wherein $R_2$ is represented by the following formula:

wherein:
q is an integer between 3 and 40, and
X is the same or different and is selected from: H and an alkyl group having from 1 to 4 carbon atoms.

3. The silicone polyether of claim 1 where $R_3$ is a methylene group.

4. The silicone polyether of claim 1 where $R_1$ is the same or different and is select from an alkyl group comprising from 8 to 20 carbon atoms.

5. The silicone polyether of claim 1 wherein R comprises at least 90 mol % of methyl groups.

6. The silicone polyether of claim 1 wherein Z comprises greater than 40 mol % of Y, and the sum of OH and organosiloxane is less than 60 mol %.

7. A silicone polyether represented by the following formula:

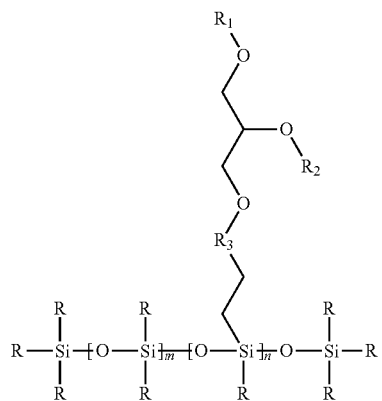

wherein:
R is the same or different and is selected from: H and a hydrocarbon group comprising from 1 to 18 carbon atoms with the proviso that R comprises less than 80 mol % H, m is an integer from 0 to 100, n is an integer from 10 to 500, $R_1$ is the same or different and is selected from an aliphatic hydrocarbon group comprising from 8 to 20 carbon atoms;

$R_2$ is represented by the following formula: $-(AO)_q-X$ wherein:
A is the same or different and is selected from aliphatic bivalent hydrocarbon group having from 2 to 4 carbon atoms with the proviso that $(AO)_q$ comprises at least 3 ethylene oxide moieties q is an integer from 3 to 40, and X is the same or different and is selected from: H and an aliphatic hydrocarbon group having from 1 to 4 carbon atoms; and $R_3$ is the same or different and is an aliphatic bivalent hydrocarbon group comprising from 1 to 4 carbon atoms.

8. A method for preparing a silicone polyether comprising the steps of combining the following components:
a) a polyorganohydrogensiloxane represented by the following formula:

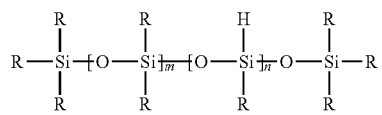

wherein:
R is the same or different and is selected from: H and a hydrocarbon group comprising from 1 to 18 carbon atoms with the proviso that R comprises less than 80 mol % H, m is an integer from 0 to 100, and n is an integer from 10 to 500, b) a polyoxyalkylene represented by the following formula:

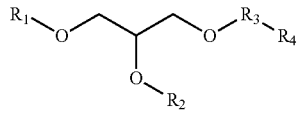

wherein:
$R_1$ is the same or different and is selected from an aliphatic hydrocarbon group comprising from 8 to 20 carbon atoms, $R_2$ is represented by the following formula: $-(AO)_q-X$ wherein:
A is the same or different and is selected from aliphatic bivalent hydrocarbon group having from 2 to 4 carbon atoms with the proviso that $(AO)_q$ comprises at least 3 ethylene oxide moieties, q is an integer from 3 to 40, and X is the same or different and is selected from: H and an aliphatic hydrocarbon group having from 1 to 4 carbon atoms, and $R_3$ is the same or different and is an aliphatic bivalent hydrocarbon group comprising from 1 to 4 carbon atoms, and $R_4$ is the same or different and is selected from alkenyl and alkynyl, and c) a hydrosilylation catalyst.

9. The method of claim 8 further comprising the steps of:
i) combining components a), b) and c) in water to form an emulsion and
ii) conducting a hydrosilylation reaction between components a) and b) to form an in-situ silicone polyether reaction product.

10. The method of claim 8 further comprising the steps of:
i) combining components a) and b) in water with mixing to form an emulsion,
ii) adding component c) to the emulsion of step i) the emulsion to form an in-situ silicone polyether reaction product.

11. The method of claim 8 further comprising the step of adding alcohol to the emulsion comprising the silicone polyether reaction product to form an emulsion comprising at least 10 wt % alcohol.

12. The method of claim 8 wherein the emulsion comprising the silicone polyether reaction product is substantially free of surfactant.

13. The method of claim 8 wherein the step of combining components a) and b) further comprising combining d) an alkenyl functional polyorganosiloxane.

14. The method of claim 8 wherein the step of combining components a) and b) further comprises combining e) an oil selected from at least one of: i) polydimethylsiloxane and ii) a hydrocarbon-based oil.

15. The method of claim 14 wherein the hydrocarbon-based oil is selected from at least one of mineral oils and vegetable oils.

* * * * *